United States Patent
Rahimi et al.

(10) Patent No.: US 10,829,658 B2
(45) Date of Patent: Nov. 10, 2020

(54) INKJET INK SET

(71) Applicant: HEWLETT-PACKARD DEVELOPMENT COMPANY, L.P., Houston, TX (US)

(72) Inventors: Alireza Rahimi, San Diego, CA (US); George Sarkisian, San Diego, CA (US); Yi-Hua Tsao, San Diego, CA (US); Benjamin Abelovski, San Diego, CA (US); Gregg A. Lane, San Diego, CA (US); Tienteh Chen, San Diego, CA (US); Or Brandstein, San Diego, CA (US); Jun Yang, Aguadilla, PR (US); Olakemi Akinlabi, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/081,869

(22) PCT Filed: Jun. 30, 2017

(86) PCT No.: PCT/US2017/040302
§ 371 (c)(1),
(2) Date: Aug. 31, 2018

(87) PCT Pub. No.: WO2018/017305
PCT Pub. Date: Jan. 25, 2018

(65) Prior Publication Data
US 2019/0315987 A1     Oct. 17, 2019

(51) Int. Cl.
*C09D 11/40*     (2014.01)
*B41M 5/00*      (2006.01)
(Continued)

(52) U.S. Cl.
CPC ............. *C09D 11/40* (2013.01); *B41J 2/2107* (2013.01); *B41M 5/0023* (2013.01);
(Continued)

(58) Field of Classification Search
CPC ... B41J 2/01; B41J 2/211; B41J 2/1433; B41J 2/17; B41J 2/17593; B41J 2/2107;
(Continued)

(56) References Cited

U.S. PATENT DOCUMENTS

| 4,204,051 A | 5/1980 | Wellner et al. |
|---|---|---|
| 5,700,851 A | 12/1997 | Banning et al. |

(Continued)

FOREIGN PATENT DOCUMENTS

| CN | 101590726 | 12/2009 |
|---|---|---|
| CN | 102884145 | 1/2013 |

(Continued)

OTHER PUBLICATIONS

International Search Report and Written Opinion for International Publication No. PCT/US2017/040302 dated Oct. 5, 2017, 10 pages.

(Continued)

*Primary Examiner* — Manish S Shah
(74) *Attorney, Agent, or Firm* — HP Inc. Patent Department (57) ABSTRACT

The present disclosure refers to an inkjet ink set including a black ink with a black pigment, a yellow ink with a yellow pigment, a cyan ink with a cyan pigment and a magenta ink with a magenta pigment, wherein at least one of the ink further contains a polyurethane binder; non-ionic surfactants; humectant solvent; non-volatile glycol ether co-solvent; a polyethylene wax emulsion and a balance of water. The inkjet ink set can also includes an orange ink, a green ink and/or a violet ink. The present disclosure refers also to a system for printing the ink set described herein.

10 Claims, 1 Drawing Sheet

(51) Int. Cl.
| | |
|---|---|
| C09D 11/322 | (2014.01) |
| B41J 2/21 | (2006.01) |
| C09D 11/023 | (2014.01) |
| C09D 11/033 | (2014.01) |
| C09D 11/037 | (2014.01) |
| C09D 11/102 | (2014.01) |
| C09D 11/12 | (2006.01) |
| C09D 11/38 | (2014.01) |

(52) U.S. Cl.
CPC .......... *C09D 11/023* (2013.01); *C09D 11/033* (2013.01); *C09D 11/037* (2013.01); *C09D 11/102* (2013.01); *C09D 11/12* (2013.01); *C09D 11/322* (2013.01); *C09D 11/38* (2013.01)

(58) Field of Classification Search
CPC ...... B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 11/0015; B41J 11/002; B41J 2/161; B41J 2/1623; B41J 2202/00; B41J 2202/03; B41J 2/14201; B41J 2/045; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; B41M 5/0011; B41M 5/0017; B41M 5/0047; B41M 7/00; B41M 7/0072; B41M 5/52; B41M 5/5218
See application file for complete search history.

(56) References Cited

U.S. PATENT DOCUMENTS

| | | | |
|---|---|---|---|
| 5,785,743 A | 7/1998 | Adamic et al. | |
| 5,889,083 A * | 3/1999 | Zhu .................. | C09D 11/30 524/275 |
| 6,136,890 A | 10/2000 | Carlson et al. | |
| 7,429,293 B2 | 9/2008 | Cai | |
| 8,008,391 B2 | 8/2011 | Enomoto et al. | |
| 8,025,384 B2 | 9/2011 | Ogasawara et al. | |
| 8,556,402 B2 | 10/2013 | Li | |
| 8,974,049 B2 | 3/2015 | Prasad et al. | |
| 9,090,734 B2 | 7/2015 | Kraiter et al. | |
| 9,296,910 B2 | 3/2016 | Brown et al. | |
| 2005/0039634 A1 | 2/2005 | Hermansky | |
| 2007/0219290 A1 | 9/2007 | Sarkisian et al. | |
| 2007/0282037 A1 | 12/2007 | Anderson et al. | |
| 2008/0022887 A1* | 1/2008 | Tanoue ................ | C09D 11/324 106/31.2 |
| 2008/0138530 A1* | 6/2008 | Lin ..................... | B41M 5/0023 427/466 |
| 2008/0146691 A1 | 6/2008 | Kruger et al. | |
| 2008/0257203 A1 | 10/2008 | Choy et al. | |
| 2009/0071366 A1* | 3/2009 | Akers, Jr. ............ | C09D 11/322 106/31.25 |
| 2009/0185019 A1 | 7/2009 | Ogasawara | |
| 2009/0239996 A1* | 9/2009 | Saito et al. ........... | C09D 11/322 524/558 |
| 2010/0047456 A1 | 2/2010 | Kariya | |
| 2010/0201768 A1* | 8/2010 | Udagawa ............ | C09B 67/0022 347/100 |
| 2011/0032303 A1* | 2/2011 | Li ....................... | B41M 5/0017 347/20 |
| 2011/0164086 A1 | 7/2011 | Goto | |
| 2011/0281988 A1* | 11/2011 | Tanoue ................ | C09D 11/324 524/386 |
| 2012/0035317 A1 | 2/2012 | Roberts et al. | |
| 2013/0083117 A1 | 4/2013 | Ohmoto | |
| 2013/0108809 A1 | 5/2013 | Noguchi et al. | |
| 2013/0201252 A1 | 8/2013 | Namba | |
| 2013/0209708 A1 | 8/2013 | Gane et al. | |
| 2013/0253130 A1 | 9/2013 | Berge | |
| 2013/0266776 A1 | 10/2013 | Matsuoka et al. | |
| 2013/0267656 A1 | 10/2013 | Berge | |
| 2013/0307914 A1 | 11/2013 | Chen | |
| 2013/0328973 A1 | 12/2013 | Kakikawa | |
| 2014/0037913 A1 | 2/2014 | Nagahama et al. | |
| 2014/0055520 A1 | 2/2014 | Inumaru et al. | |
| 2014/0192112 A1 | 7/2014 | Nagashima | |
| 2014/0364548 A1 | 12/2014 | Everhardus et al. | |
| 2016/0215157 A1 | 7/2016 | Kakikawa | |
| 2017/0037269 A1 | 2/2017 | Isobe | |
| 2017/0183522 A1 | 6/2017 | Chaffins | |

FOREIGN PATENT DOCUMENTS

| | | |
|---|---|---|
| CN | 104662108 | 5/2015 |
| JP | H0625377 | 2/1994 |
| JP | 2009233486 | 10/2009 |
| JP | 2012201730 | 10/2012 |
| RU | 2264493 | 11/2005 |
| SU | 482433 A | 5/1976 |
| WO | WO-2001094480 A3 | 12/2001 |
| WO | WO-2007112244 A2 | 10/2007 |
| WO | WO-2012105949 A1 | 8/2012 |
| WO | WO 2015023274 | 2/2015 |
| WO | WO 2015041702 | 3/2015 |
| WO | WO-2015112115 A1 | 7/2015 |
| WO | WO 2015116028 | 8/2015 |
| WO | WO 2015116029 | 8/2015 |
| WO | WO 2015116030 | 8/2015 |
| WO | WO-2015130498 A2 | 9/2015 |
| WO | WO-2015187143 | 12/2015 |
| WO | WO-2016018306 A1 | 2/2016 |
| WO | WO-2016030452 A1 | 3/2016 |
| WO | WO-2016030454 A1 | 3/2016 |
| WO | WO-2016068985 | 5/2016 |
| WO | WO-2016122563 | 8/2016 |
| WO | WO-2016122566 | 8/2016 |
| WO | WO-2016122569 A1 | 8/2016 |
| WO | WO-2017074349 | 5/2017 |
| WO | WO 2018156156 | 8/2018 |
| WO | WO 2018182568 | 10/2018 |
| WO | WO 2018190806 | 10/2018 |

OTHER PUBLICATIONS

"Definition of compound—Chemistry Dictionary", 2017, 4 pages.
Nelson, Daniel, "Amino Group: Definition and Examples", Science Trends, May 16, 2019, 3 pages.
"Alkyl groups", IUPAC Gold Book, 2008, 1 page.

* cited by examiner

INKJET INK SET

BACKGROUND

In addition to home and office usage, inkjet technology has been expanded to high-speed, commercial and industrial printing. Inkjet printing is a non-impact printing method that utilizes electronic signals to control and direct droplets or a stream of ink to be deposited on media. Some commercial and industrial inkjet printers utilize fixed printheads and a moving substrate web in order to achieve high speed printing. Current inkjet printing technology involves forcing the ink drops through small nozzles by thermal ejection, piezoelectric pressure or oscillation onto the surface of the media. This technology has become a popular way of recording images on various media surfaces (e.g., paper), for many reasons, including, low printer noise, capability of high-speed recording and multi-color recording. In some instances, an ink set (which may include two or more different colored inks) may be used as an ink source for the inkjet printing system. The ink droplets, that are formed from one or more of the inks that are part of an ink set, are ejected from a nozzle by the inkjet system onto the paper to produce an image thereon. The inks play a fundamental role in the image quality resulting from this printing technique.

BRIEF DESCRIPTION OF THE DRAWINGS

The drawings illustrate various examples of the present print medium and are part of the specification.

DETAILED DESCRIPTION

Before examples of the present disclosure are disclosed and described, it is to be understood that the present disclosure is not limited to the particular process and materials disclosed herein. It is also to be understood that the terminology used herein is used for describing examples only and is not intended to be limiting, as the scope of protection will be defined by the claims and equivalents thereof. In describing and claiming the present composition and method, the following terminology will be used: the singular forms "a", "an", and "the" include plural referents unless the context clearly dictates otherwise. Concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For examples, a weight range of about 1 wt % to about 20 wt % should be interpreted to include not only the explicitly recited concentration limits of 1 wt % to 20 wt %, but also to include individual concentrations such as 2 wt %, 3 wt %, 4 wt %, and sub-ranges such as 5 wt % to 15 wt %, 10 wt % to 20 wt %, etc. The percent are by weight (wt %) unless otherwise indicated. As used herein, "image" refers to marks, signs, symbols, figures, indications, and/or appearances deposited upon a material or substrate with either visible or an invisible ink composition.

As used herein, the term "ink set" refers to an ink composition package comprising two or more ink compositions having different colors from each other and that might be used in conjunction, in a common printer system, to form a color image. The term "ink set" refers thus to all individual inks or fluids an inkjet printer is equipped to jet. All of the inks present in a common printer can be considered an ink set, or a few inks from a larger group on inks can be considered to be an ink set. As used herein, the term "inkjet" ink set refers to herein to an ink set that would be used in an inkjet printing system or inkjet printer. Such inkjet printing system or printer can be a thermal inkjet printer, piezoelectric inkjet printers, other drop on demand inkjet printers, and/or continuous inkjet printers.

The inks described herein are liquid thermal inkjet ink that include a colorant dispersed in an ink vehicle. As used herein, the term "ink vehicle" refers to the combination of at least one or more solvents and water to form a vehicle in which the colorant is placed to form an ink. It is to be understood that the respective ink vehicles for the black ink, the yellow ink, the cyan ink, and the magenta ink can be substantially the same or not. The ink vehicle for these respective inks is formulated so that the vehicle is compatible with polyurethane as a binder (described in further detail below). The term aqueous vehicle can refer to water or a mixture of water and at least one water-soluble, or partially water-soluble (i.e. methyl ethyl ketone) or organic solvent (co-solvent).

The present disclosure refers to an inkjet ink set comprising a black ink with a black pigment, a yellow ink with a yellow pigment, a cyan ink with a cyan pigment and a magenta ink with a magenta pigment, wherein at least one of the ink further contains a polyurethane binder; non-ionic surfactants; humectant solvent; non-volatile glycol ether co-solvent; a polyethylene wax emulsion and a balance of water. The present disclosure refers also to a system for printing the ink set described herein. In some examples, the inkjet ink set defined herein further comprises one or more inks selected from the group consisting of an orange ink with an orange pigment, a violet ink with a violet pigment and a green ink with a green pigment.

The printed inks of the ink set exhibit improved print quality, as well as improved reliability (e.g., in terms of nozzle health and kogation) during high-speed printing (e.g., during the printing of at least one hundred pages per minute).

The ink set of the present disclosure exhibits good image quality and good image durability when the inks, contained in the ink set, are used in inkjet printing devices and printed on substrates to form a printed image. Image quality performance may be measured in terms of the optical density, coalescence, and gloss of a printed image. The term "optical density," as referred to herein, means the ability of a printed image to retard light rays. A higher optical density equates to better image quality performance. The term "coalescence," as used to herein, refers to the phenomenon of separately deposited drops of ink. Coalescence can lead to blurring of the printed image and therefore, to poor image quality performance. The term "gloss," as referred to herein, means the shine or luster of a printed image. A higher gloss is indicative of good image quality performance.

Durability performance may be measured in terms of the mechability and abrasion resistance of a printed image. The term "mechability," as referred to herein, is a form of durability, and means the ability of a printed image to remain undamaged when rubbed immediately after printing. Printers may contain media rollers, which may pass over images shortly after they are printed (e.g., within a few seconds). The stress applied to the printed image by the media rollers, which may be at elevated temperatures, may damage the image by changing its gloss, optical density, or film uniformity. The media rollers may also damage the printed image by removing pieces of the ink film and/or exposing bare media. A mechability test may simulate these post-printing conditions and determine if the printed image is durable enough to withstand the stress that may be applied by the media rollers. The term "abrasion resistance," as referred to herein means the ability of a printed image to remain undamaged when rubbed. High abrasion resistance can lead to good durability performance.

The ink sets of the present disclosure also have good jettability performances. The term "decap performance," as referred to herein, means the ability of the inkjet ink to readily eject from the printhead, upon prolonged exposure to air. The decap time is measured as the amount of time that a printhead may be left uncapped before the printer nozzles no longer fire properly, potentially because of clogging, plugging, or retraction of the colorant from the drop forming region of the nozzle/firing chamber. The length of time a thermal inkjet pen can remain unused and uncapped before spitting would be required to form an acceptable quality ink drop is called decap time, or first drop decap time. Another decap metric is the number of spits required to get the pen healthy at a specific time interval. The longest decap time that would give acceptable first drop quality or the fewest number of spits required at any given decap time would be desirable for any given ink.

In some examples, the inkjet ink set comprises a black ink comprising a black pigment; a yellow ink comprising a yellow pigment; a cyan ink comprising a cyan pigment; and a magenta ink comprising a magenta pigment. At least one of the inks further contains a polyurethane dispersion, non-ionic surfactant humectant solvent including a hydrophilic group, non-volatile glycol ether co-solvent, a polyethylene wax emulsion and a balance of water.

Pigments

The ink compositions that are part of the ink set comprise, at least, a pigment. The term pigment refers to any organic or inorganic pigment colorants, magnetic particles, aluminas, silicas, and/or other ceramics, organo-metallics, metallic particulates, or other opaque particles that introduce color to the ink vehicle. Pigments are suspended in the liquid vehicle and are therefore referred as pigment dispersion The average particle size of the pigments, present in any of the ink composition of the ink set, may range anywhere from about 50 nm to about 200 nm. In an example, the average particle size ranges from about 80 nm to about 150 nm. The total amount of pigment dispersion in the ink can range from about 1.5% to about 5% based on the total weight of the liquid ink. In some examples, the total amount of pigment dispersion in the ink can range from about 2% to about 4% based on the total weight of the liquid ink. This weight percentage accounts for the weight percent of active pigment present in the liquid ink, and does not account for the total weight percent of the pigment dispersion in the liquid ink. As such, the weight percentages given for the pigment dispersion do not account for any other components (e.g., water) that may be present when the pigment is part of the dispersion.

The black ink, that is part of the ink set of the present disclosure, includes a black pigment. Said black pigment will provide a black color to the black ink. Carbon black may be a suitable black pigment. Examples of carbon black pigments include those manufactured by Mitsubishi Chemical Corporation, Japan (such as, e.g., carbon black No. 2300, No. 900, MCF88, No. 33, No. 40, No. 45, No. 52, MA7, MA8, MA100, and No. 2200B); various carbon black pigments of the RAVEN® series manufactured by Columbian Chemicals Company, Marietta, Ga., (such as, e.g., RAVEN® 5750, RAVEN® 5250, RAVEN® 5000, RAVEN® 3500, RAVEN® 1255, and RAVEN® 700); various carbon black pigments of the REGAL® series, the MOGUL® series, or the MONARCH® series manufactured by Cabot Corporation, Boston, Mass., (such as, e.g., REGAL® 400R, REGAL® 330R, REGAL® 660R, MOGUL® E, MOGUL® L, AND ELFTEX® 410); and various black pigments manufactured by Evonik Degussa Orion Corporation, Parsippany, N.J., (such as, e.g., Color Black FW1, Color Black FW2, Color Black FW2V, Color Black FW18, Color Black FW200, Color Black S150, Color Black S160, Color Black S170, PRINTEX® 35, PRINTEX® U, PRINTEX® V, PRINTEX® 140U, Special Black 5, Special Black 4A, and Special Black 4). An example of an organic black pigment includes aniline black, such as C.I. Pigment Black 1.

The yellow ink, that is part of the ink set of the present disclosure, includes a yellow pigment. Said yellow pigment will provide a yellow color to the yellow ink. Examples of suitable yellow pigments include C.I. Pigment Yellow 1, C.I. Pigment Yellow 2, C.I. Pigment Yellow 3, C.I. Pigment Yellow 4, C.I. Pigment Yellow 5, C.I. Pigment Yellow 6, C.I. Pigment Yellow 7, C.I. Pigment Yellow 10, C.I. Pigment Yellow 11, C.I. Pigment Yellow 12, C.I. Pigment Yellow 13, C.I. Pigment Yellow 14, C.I. Pigment Yellow 16, C.I. Pigment Yellow 17, C.I. Pigment Yellow 24, C.I. Pigment Yellow 34, C.I. Pigment Yellow 35, C.I. Pigment Yellow 37, C.I. Pigment Yellow 53, C.I. Pigment Yellow 55, C.I. Pigment Yellow 65, C.I. Pigment Yellow 73, C.I. Pigment Yellow 74, C.I. Pigment Yellow 75, C.I. Pigment Yellow 77, C.I. Pigment Yellow 81, C.I. Pigment Yellow 83, C.I. Pigment Yellow 93, C.I. Pigment Yellow 94, C.I. Pigment Yellow 95, C.I. Pigment Yellow 97, C.I. Pigment Yellow 98, C.I. Pigment Yellow 99, C.I. Pigment Yellow 108, C.I. Pigment Yellow 109, C.I. Pigment Yellow 110, C.I. Pigment Yellow 113, C.I. Pigment Yellow 114, C.I. Pigment Yellow 117, C.I. Pigment Yellow 120, C.I. Pigment Yellow 122, C.I. Pigment Yellow 124, C.I. Pigment Yellow 128, C.I. Pigment Yellow 129, C.I. Pigment Yellow 133, C.I. Pigment Yellow 138, C.I. Pigment Yellow 139, C.I. Pigment Yellow 147, C.I. Pigment Yellow 150, C.I. Pigment Yellow 151, C.I. Pigment Yellow 153, C.I. Pigment Yellow 154, C.I. Pigment Yellow 155, C.I. Pigment Yellow 167, C.I. Pigment Yellow 172, C.I. Pigment Yellow 180, C.I. Pigment Yellow 185, and C.I. Pigment Yellow 213. In some examples, the yellow pigment is C.I. Pigment Yellow 74.

The cyan ink, that is part of the ink set of the present disclosure, includes a cyan pigment. Said cyan pigment will provide a cyan color to the cyan ink Examples of suitable cyan pigments include C.I. Pigment Blue 1, C.I. Pigment Blue 2, C.I. Pigment Blue 3, C.I. Pigment Blue 15, Pigment Blue 15:3, C.I. Pigment Blue 15:34, C.I. Pigment Blue 15:4, C.I. Pigment Blue 16, C.I. Pigment Blue 18, C.I. Pigment Blue 22, C.I. Pigment Blue 25, C.I. Pigment Blue 60, C.I. Pigment Blue 65, C.I. Pigment Blue 66, C.I. Vat Blue 4, and C.I. Vat Blue 60.

The magenta ink, that is part of the ink set of the present disclosure, includes a magenta pigment. Said magenta pigment will provide a magenta color to the magenta ink. Examples of suitable magenta pigments are organic pigment that include C.I. Pigment Red 1, C.I. Pigment Red 2, C.I. Pigment Red 3, C.I. Pigment Red 4, C.I. Pigment Red 5, C.I. Pigment Red 6, C.I. Pigment Red 7, C.I. Pigment Red 8, C.I. Pigment Red 9, C.I. Pigment Red 10, C.I. Pigment Red 11, C.I. Pigment Red 12, C.I. Pigment Red 14, C.I. Pigment Red 15, C.I. Pigment Red 16, C.I. Pigment Red 17, C.I. Pigment Red 18, C.I. Pigment Red 19, C.I. Pigment Red 21, C.I. Pigment Red 22, C.I. Pigment Red 23, C.I. Pigment Red 30, C.I. Pigment Red 31, C.I. Pigment Red 32, C.I. Pigment Red 37, C.I. Pigment Red 38, C.I. Pigment Red 40, C.I. Pigment Red 41, C.I. Pigment Red 42, C.I. Pigment Red 48(Ca), C.I. Pigment Red 48(Mn), C.I. Pigment Red 57(Ca), C.I. Pigment Red 57:1, C.I. Pigment Red 88, C.I. Pigment Red 112, C.I. Pigment Red 114, C.I. Pigment Red 122, C.I. Pigment Red 123, C.I. Pigment Red 144, C.I. Pigment Red 146, C.I. Pigment Red 149, C.I. Pigment Red 150, C.I. Pigment Red 166, C.I. Pigment Red 168, C.I. Pigment Red 170, C.I. Pigment Red 171, C.I. Pigment Red 175, C.I. Pigment Red 176, C.I. Pigment Red 177, C.I. Pigment Red 178, C.I. Pigment Red 179, C.I. Pigment Red 184, C.I. Pigment Red 185, C.I. Pigment Red 187, C.I. Pigment Red 202, C.I. Pigment Red 209, C.I. Pigment Red 213, C.I. Pigment Red 219, C.I. Pigment Red 224, C.I. Pigment Red 245, C.I. Pigment Red 282, C.I. Pigment Red 286, C.I.

In some examples, the ink set ink further comprises one or more inks selected from the group consisting of an orange ink with an orange pigment, a violet ink with a violet pigment and a green ink with a green pigment. The ink set ink can include an orange and/or a violet and/or a green ink.

The ink set can further include a violet ink. Said violet ink comprises a violet pigment that will impart a violet color to the ink. Examples of suitable violet organic pigments include C.I. pigment Violet 19, C.I. Pigment Violet 23, C.I. Pigment Violet 32, C.I. Pigment Violet 33, C.I. Pigment Violet 36, C.I. Pigment Violet 38, C.I. Pigment Violet 43, C.I. Pigment Violet 50, and C.I. Pigment Violet 55.

In some other examples, the ink set can further include a green ink. Said green ink comprises a green pigment that will impart a green color to the ink. Some examples of green organic pigments include C.I. Pigment Green 1, C.I. Pigment Green 2, C.I. Pigment Green 4, C.I. Pigment Green 7, C.I. Pigment Green 8, C.I. Pigment Green 10, C.I. Pigment Green 36, and C.I. Pigment Green 45.

In yet some other examples, the ink set can further include an orange ink. Said orange ink comprises a orange pigment that will impart an orange color to the ink. Some examples of orange organic pigments include C.I. Pigment Orange 1, C.I. Pigment Orange 2, C.I. Pigment Orange 5, C.I. Pigment Orange 7, C.I. Pigment Orange 13, C.I. Pigment Orange 15, C.I. Pigment Orange 16, C.I. Pigment Orange 17, C.I. Pigment Orange 19, C.I. Pigment Orange 24, C.I. Pigment Orange 34, C.I. Pigment Orange 36, C.I. Pigment Orange 38, C.I. Pigment Orange 40, C.I. Pigment Orange 43, C.I. Pigment Orange 64, C.I. Pigment Orange 66, and C.I. Pigment Orange 71.

The pigments that are present in any of the ink composition of the ink set, may be dispersed by an anionic polymer (i.e., anionic polymeric dispersant). In some examples, the pigments, that are part of black, yellow, cyan, and/or magenta inks, are part of the are dispersed by the anionic polymer. The dispersant may be present in an amount ranging from about 0.1 wt % to about 5 wt % of a total wt % of the liquid ink. The above-described pigments can be dispersed into a polymeric dispersion. The polymeric dispersion can assist in dispersing the pigment in a solvent system. In an example, the dispersant may be styrene-acrylic-type dispersants such as acrylic dispersants having i) hydrophilic monomers including acidic monomers, and ii) hydrophobic monomers. The acid number of the dispersant may range from about 120 mg/g to about 300 mg/g. It is to be understood that the styrene-acrylic-type dispersants are water-soluble. As such, no latex polymer is present in the ink composition.

Acidic monomers that may be used in the acrylic dispersant may include, for example, acrylic acid, methacrylic acid, ethacrylic acid, dimethylacrylic acid, maleic anhydride, maleic acid, vinylsulfonate, cyanoacrylic acid, vinylacetic acid, allylacetic acid, ethylidineacetic acid, propylidineacetic acid, crotonoic acid, fumaric acid, itaconic acid, sorbic acid, angelic acid, cinnamic acid, styrylacrylic acid, citraconic acid, glutaconic acid, aconitic acid, phenylacrylic acid, acryloxypropionic acid, aconitic acid, phenylacrylic acid, acryloxypropionic acid, vinylbenzoic acid, N-vinyl-succinamidic acid, mesaconic acid, methacroylalanine, acryloylhydroxyglycine, sulfoethyl methacrylic acid, sulfopropyl acrylic acid, styrene sulfonic acid, sulfoethylacrylic acid, 2-methacryloyloxymethane-1-sulfonic acid, 3-methacryoyloxypropane-1-sulfonic acid, 3-(vinyloxy)propane-1-sulfonic acid, ethylenesulfonic acid, vinyl sulfuric acid, 4-vinylphenyl sulfuric acid, ethylene phosphonic acid, vinyl phosphoric acid, vinyl benzoic acid, 2-acrylamido-2-methyl-1-propanesulfonic acid, and combinations thereof. Examples of the hydrophobic monomers that can be polymerized in the acrylic dispersant may include styrene, p-methyl styrene, methyl methacrylate, hexyl acrylate, hexyl methacrylate, butyl acrylate, butyl methacrylate, ethyl acrylate, ethyl methacrylate, propyl acrylate, propyl methacrylate, octadecyl acrylate, octadecyl methacrylate, stearyl methacrylate, vinylbenzyl chloride, isobornyl acrylate, tetrahydrofurfuryl acrylate, 2-phenoxyethyl methacrylate, ethoxylated nonyl phenol methacrylate, isobornyl methacrylate, cyclohexyl methacrylate, t-butyl methacrylate, n-octyl methacrylate, lauryl methacrylate, tridecyl methacrylate, alkoxylated tetrahydrofurfuryl acrylate, isodecyl acrylate, isobornylmethacrylate, and combinations thereof. Some non-limiting commercial examples of useful styrene acrylic polymers are sold under the trade names Joncryl® (S.C. Johnson Co.), Ucar® (Dow Chemical Co.), Jonrez® (Mead-Westvaco Corp.), and Vancryl® (Air Products and Chemicals, Inc.).

Polyurethane Binder

The ink compositions that are part of the ink set comprise a polyurethane binder. The polyurethane binder is present in the ink in the form of a polyurethane dispersion. By "polyurethane dispersion" it is meant herein a polyurethane binder or polyurethane that is dispersed in a liquid medium. In some examples, the polyurethane binder is present in a dispersion with water. As used herein, the term "dispersion" refers to a two-phases system where one phase consists of finely divided particles of polyurethane binder distributed throughout a bulk substance, i.e. liquid vehicle. The polyurethane particles being the dispersed or internal phase and the bulk substance being the continuous or external phase (liquid vehicle).

In some examples, the polyurethane dispersion is present in the ink in an amount ranging from about 1 wt % to about 20 wt % based upon the total wt % of the inkjet ink. In some other examples, the polyurethane dispersion is present in the ink in an amount ranging from about 2 wt % to about 15 wt % based upon the total wt % of the ink composition. In yet some other examples, the polyurethane dispersion is present in the ink in an amount ranging from about 3 wt % to about 10 wt % based upon the total wt % of the ink composition. The weight percentages given for the polyurethane dispersion do not account for any other components (e.g., water) that may be present when the polyurethane is part of the dispersion. The polyurethane dispersion may be added with the pigment (e.g., pigment dispersion) and the components of the ink vehicle to form the liquid thermal inkjet ink.

Examples of suitable polyurethanes include an aromatic polyether polyurethane, an aliphatic polyether polyurethane, an aromatic polyester polyurethane, an aliphatic polyester polyurethane, an aromatic polycaprolactam polyurethane, an aliphatic polycaprolactam polyurethane, a vinyl-urethane hybrid polymer, an acrylic-urethane hybrid polymer, a copolymer thereof, and a combination thereof. The polyurethanes can include polyurethane, polyurea, polyurethane with a curable double bond, polyurethane-graft polyol, or a combination thereof. In some examples, the polyurethane binder can be a polyurethane having a curable double bond. The polyurethane binder can have a curable double bond that can be (n-(2-hydroxyethyl)acrylamide-2-hydroxyethyl acrylate, 2-hydroxypropyl bis-methyl methacrylate, or a combination thereof. In another example, the polyurethane binder is a polyurethane graft polyol. In a further example, the binder can include a polyurethane graft polyol such as PUG-49, PUG-84, PUG-400 or Pluracol® (available from BASF, New Jersey). In yet another example, the binder can be any of the previously mentioned binders and can further include an acrylic functional group. For example, the binder can include methyl methacrylate, 2-ethylhexyl acrylate, 2-(2-ethoxyethoxy)ethyl acrylate, or a combination thereof.

In some examples, the polyurethanes can have an average molecular weight ranging from 10,000 MW to 100,000 MW. or an average molecular weight ranging from 15,000 MW to 50,000 MW.

In some examples, the polyurethane binder contains a polyisocyanate component (A) and a first polyol (B) and a second polyol (C). The polyurethane binder can also be a polyurethane binder dispersion that comprises (A) a polyisocyanate; (B) a first polyol having a chain with two hydroxyl functional groups at one end of the chain and no hydroxyl groups at an opposed end of the chain; (C) a second polyol having a chain with two hydroxyl functional groups at both ends of the chain. The polyurethane binder can further comprise a component (D) which is a carboxylic acid functional group with two hydroxyl functional groups. The polyurethane binder can further comprise a component (E) with a formula [(M$^+$)m; (X)n-R—Y] wherein: m is 0 or 1; M is a metal; n is 2 to 10; X is an amino group, R is a $C_1$ to $C_{18}$ alkyl group, a $C_6$ to $C_{30}$ aromatic compound or a $C_4$ to $C_{20}$ aliphatic cyclic compound, and Y is $SO_3^-$ or $SO_3H$ with the proviso that when m is 0, Y is $SO_3H$ and when m is 1, Y is $SO_3^-$.

In some other examples, the polyurethane binder may be formed from the following components: (A) a polyisocyanate; (B) a polyol having a chain with two hydroxyl functional groups at one end of the chain and no hydroxyl functional groups at the opposed end of the chain; and (C) an alcohol, or a diol, or an amine with a number average molecular weight less than 500; and one of (i) a carboxylic acid; (ii) a sulfonate or sulfonic acid having one amino functional group; (iii) a combination of (i) and (ii); and (iv) a combination of (i) and a homopolymer or copolymer of poly(ethylene glycol) having one or two hydroxyl functional groups or one or two amino functional groups at one end of its chain.

In yet some other examples, the polyurethane binder is a polyurethane binder dispersion wherein polyurethane comprises: (A) a polyisocyanate; (B) a first polyol having a chain with two hydroxyl functional groups at one end of the chain and no hydroxyl groups at an opposed end of the chain; (C) a second polyol having a chain with two hydroxyl functional groups at both ends of the chain; (D) a carboxylic acid functional group with two hydroxyl functional groups; and (E) a compound shown in formula [(M$^+$)m; (X)n-R—Y] wherein: m is 0 or 1; M is a metal; n is 2 to 10; X is an amino group, R is a $C_1$ to $C_{18}$ alkyl group, a $C_6$ to $C_{30}$ aromatic compound or a $C_4$ to $C_{20}$ aliphatic cyclic compound, and Y is $SO_3^-$ or $SO_3H$ with the proviso that when m is 0, Y is $SO_3H$ and when m is 1, Y is $SO_3^-$.

In some other examples, polyurethane further comprises an optional homopolymer or copolymer of poly(ethylene glycol) having one or two hydroxyl functional groups or one or two amino functional groups at one end of its chain (F).

In yet some other examples, the polyurethane comprise: (A) a polyisocyanate, which is an isophorone diisocyanate (IPDI); (B) a first polyol having a chain with two hydroxyl functional groups at one end of the chain and no hydroxyl groups at an opposed end of the chain; (C) a polyether polyol having a chain with two hydroxyl functional groups at both ends of the chain; (D) a carboxylic acid functional group with two hydroxyl functional groups; (E) a sulfonate or sulfonic acid functional group having two amino functional groups; and (F) an optional homopolymer or copolymer of poly(ethylene glycol) having one or two hydroxyl functional groups or one or two amino functional groups at one end of its chain.

The polyurethane can also be defined as the following: (A) is isophorone diisocyanate, which is present in the polyurethane in an amount of from about 24 wt % to about 30 wt % based on the total weight of the polyurethane, (B) is a copolymer of methyl methacrylate-co-ethylhexylacrylate-co-ethoxyethoxyethylacrylate with two hydroxy groups at one end, which is present in the polyurethane in an amount of from about 40 wt % to about 50 wt % based on the total weight of the polyurethane, wherein (B) the copolymer comprises about 75 wt % of methyl methacrylate, about 15 wt % of ethylhexylacrylate, and about 10 wt % of ethoxyethoxyethylacrylate, each based on the total weight of (B), (C) is polypropylene glycol with a $M_n$ of 1000 g/mol, which is present in the polyurethane in an amount of from about 12 wt % to about 18 wt % based on the total weight of the polyurethane, (D) is dimethylolpropionic acid, which is present in the polyurethane in an amount of from about 2 wt % to about 6 wt % based on the total weight of the polyurethane, and (E) is sodium 2-[(2-aminoethyl)amino] ethanesulphonate, which is present in the polyurethane in an amount of from about 8 wt % to about 12 wt % based on the total weight of the polyurethane.

In some examples, when defining (A) the polyisocyanate, any suitable polyisocyanate may be used. Some suitable polyisocyanates have an average of about two or more isocyanate groups. In an example, the polyisocyanate includes an average of from about 2 to about 4 isocyanate groups per molecule and from about 5 to 20 carbon atoms (in addition to nitrogen, oxygen, and hydrogen). Component (A) may be an aliphatic, cycloaliphatic, araliphatic, or aromatic polyisocyanate, as well as products of their oligomerization, used alone or in mixtures of two or more. For example, a polyisocyanate having an average of two or more isocyanate groups may be used. Some examples of polyisocyanates include hexamethylene-1,6-diisocyanate (HDI), 2,2,4-trimethyl-hexamethylene-diisocyanate (TMDI), 1,12-dodecane diisocyanate, 2,4,4-trimethyl-hexamethylene diisocyanate, 2-methyl-1,5-pentamethylene diisocyanate, isophorone diisocyanate (IPDI), dicyclohexylmethane-4,4-diisocyanate (H12MDI), and combinations thereof. The amount of the polyisocyanate in the polyurethane-based binder dispersion ranges from about 20 wt % to about 45 wt % of the total weight of the polyurethane-based binder dispersion. In an example, polyisocyanate makes up from about 25 wt % to about 35 wt % of the polyurethane binder.

The amount of component (B) (i.e., the first polyol) in the polyurethane-based binder dispersion can range from about 10 wt % to about 70 wt % of the total weight of the polyurethane-based binder dispersion. In an example, component (B) (i.e., the first polyol) can make up from about 30 wt % to about 60 wt % of the polyurethane binder. The first polyol (B) can include any product having a chain with two hydroxyl groups at one end of the chain and no hydroxyl groups at the opposed end of the chain. The first polyol has a number average molecular weight ($M_n$) ranging from about 500 g/mol to about 5000 g/mol. Additionally, the first polyol has a glass transition temperature ($T_g$) ranging from about −20° C. to about 100° C. In an example, the glass transition temperature can range from about 0° C. to about 80° C. The first polyol may be formed from the free radical polymerization of a monomer in the presence of a mercaptan that includes two hydroxyl functional groups or two carboxylic functional groups. Some examples of the monomer used to form component (B) include an alkylester of acrylic acid or an alkylester of methacrylic acid, such as methyl (meth)acrylate, ethyl (meth)acrylate, n-butyl (meth)acrylate, tetrahydrofuryl (meth)acrylate, t-butyl (meth)acrylate, 2-ethylhexyl (meth)acrylate, hexyl (meth)acrylate, cyclohexyl (meth)acrylate, phenyl (meth)acrylate, benzyl (meth) acrylate, 2-aziridinylethyl (meth)acrylate, aminomethyl acrylate, aminoethyl acrylate, aminopropyl (meth)acrylate, amino-n-butyl(meth)acrylate, N,N-dimethylaminoethyl (meth)acrylate, N,N-dimethylaminopropyl (meth)acrylate, N,N-diethylaminoethyl (meth)acrylate, and N,N-diethylaminopropyl (meth)acrylate. Some other examples of the monomer used to form component (B) include an acid group containing monomer, such as acrylic acid, methacrylic acid, carboxyethyl (meth)acrylate, 2-(meth)acryloyl propionic acid, crotonic acid, and itaconic acid. In another example, the monomer used to form component (B) may be an acrylamide, an acrylamide derivative, methacrylamide, or a methacrylamide derivative. Some examples of acrylamide and methacrylamide derivatives include hydroxyethylacrylamide, N,N-methylol(meth)acrylamide, N-butoxymethyl (meth)acrylamide, and N-isobutoxymethyl (meth)acrylamide. Some further examples of the monomer used to form component (B) may be styrene or a styrene derivative. Some examples of styrene derivatives include alpha-methyl styrene, p-aminostyrene, and 2-vinylpyridine. Additionally, the monomer used to form component (B) may be acrylonitrile, vinylidene chloride, a fluorine containing acrylate, a fluorine containing methacrylate, a siloxane containing acrylate, a siloxane containing methacrylate, vinyl acetate, or N-vinylpyrrolidone. Some specific examples include 2,2,2-trifluoroethyl acrylate, 1H,1H,3H-hexafluorobutyl acrylate, 1H,1H,3H-tetrafluoropropyl methacrylate, 1H, 1H,5H-octafluoropentyl methacrylate, 1H, 1H,5H-octafluoropentyl acrylate, poly(dimethylsiloxane), methacryloxypropyl terminated polydimethylsiloxane DMS-R11 (made by Gelest Chemicals), and (3-acryloxy-2-hydroxypropoxypropyl) terminated polydimethylsiloxane DMS-U21 (made by Gelest Chemicals). It is to be understood that any combination of monomers listed for component (B) may be used.

In some examples, the second polyol (i.e., component (C) can be present in the polyurethane-based binder dispersion in an amount of from about 8 wt % to about 25 wt % based on the total weight of the polyurethane-based binder dispersion. In an example, component (B) (i.e., the first polyol) makes up from about 10 wt % to about 20 wt % of the polyurethane binder. The second polyol(s) can have a number average molecular weight (Mn) of about 500 g/mol to about 3000 g/mol and have one hydroxyl group attached at each end of the polyol. Examples of second polyols include polyester polyols, polyether polyols, polycarbonate polyol, polyester-polycarbonate polyol, or mixtures thereof. In some examples, the second polyol can be poly(propyleneglycol), poly(tetrahydrofuran), poly(carbonate) polyol, or mixtures thereof. Examples of polycarbonate polyol include polycarbonate polyols from Kuraray Co. Ltd. (e.g., C-590, C-1050, C-1090, C-2050, C-2090, and C-3090) and polycarbonate diols from UBE Industries, Ltd. (e.g., Eternacoll® Uh-50, Eternacoll® Uh-100, Eternacoll® Uh-200, Eternacoll® Ph-5-, Eternacoll® Ph-100, Eternacoll® Ph-200 And Eternacoll® Um90(1/3)).

Component (D) can be a carboxylic acid functional group with two hydroxyl functional groups. The amount of component (D) in the polyurethane-based binder dispersion ranges from 1 wt % to about 10 wt % based upon the total weight of the polyurethane. In an example, component (D) makes up from about 2 wt % to about 6 wt % of the polyurethane binder. In some instances, component (D) includes two or more hydroxyl groups. Component (D) may have a number average molecular weight (Mn) of about 500 g/mol. Examples of component (D) may be derived from hydroxy-carboxylic acids having the general formula (HO)xQ(COOH)y, where Q is a straight or branched hydrocarbon radical containing 1 to 12 carbon atoms, and x is 2 or 3 and y ranges from 1 to 3. Examples of component (D) can include dimethylol propionic acid (DMPA), dimethylol butanoic acid (DMBA), alanine, citric acid, tartaric acid, glycolic acid, lactic acid, malic acid, dihydroxymaleic acid, dihydroxytartaric acid, or mixtures thereof.

In some examples, component (E) can be a compound shown in formula (M+) m; n(X)n-R—Y wherein m is 0 or 1; M is a metal; n is 2 to 10; X is an amino group, R is a C1 to C18 alkyl group, a C6 to C30 aromatic compound or a C4 to C20 aliphatic cyclic compound, and Y is SO3- or SO3H with the proviso that when m is 0, Y is SO3H and when m is 1, Y is SO3-. In some examples, m is 1; M is sodium, potassium, magnesium, calcium, or lithium; n is 2 to 4; X is an amino group; R is a C1 to C8 alkyl group; and Y is SO3-. In some other examples, the sulfonate or sulfonic acid amine compound (i.e., component (E)) can have two or more amino functional groups. In some examples, sulfonate or sulfonic acid amine compound (i.e., component (E)) can have two to ten amino functional groups. In some examples, sulfonate or sulfonic acid amine compound (i.e., component (E)) can have two to four amino functional groups. In some examples, sulfonate or sulfonic acid amine compound (i.e., component (E)) can have two amino functional groups. Component (E) may be present in the polyurethane-based binder dispersion an amount ranging from about 1 wt % to about 20 wt % based upon the total weight of the polyurethane-based binder dispersion. In an example, component (E) can be present in an amount ranging from about 2 wt % to about 20 wt % of the polyurethane-based binder dispersion. In another example, component (E) may be present in an amount of about 5 wt % to about 15 wt % of the polyurethane-based binder dispersion.

Some examples of component (E) include ethyldiamineethylsulfonic acid or a salt thereof, ethyldiaminepropylsulfonic acid or a salt thereof, 5-amino-2-(aminomethyl)-1-pentanesulfonic acid or a salt thereof, 2,3-diamino-1-propanesulfonic acid or a salt thereof, 3-[bis(2 aminoethyl) amino]-1-propanesulfonic acid or a salt thereof, 2-[bis(2-aminoethyl) amino]-ethanesulfonic acid or a salt thereof, 2-[(2-aminoethyl)amino]-1-propanesulfonic acid or a salt thereof, 2-[[2-[(1-methylethyl)amino]ethyl]amino]-ethanesulfonic acid or a salt thereof, 2-[(2-aminoethyl)amino]-1-pentanesulfonic acid or a salt thereof, or mixtures thereof. In some other examples, component (E) can also be sodium 2-[(2-aminoethyl)amino]ethanesulphonate or sodium diaminoethylpropylsulfonate.

In some examples, the polyurethane compound further comprises a components (F) which is a Homopolymer or Copolymer of poly(ethylene glycol). The component (F) can be a homopolymer or copolymer of poly(ethylene glycol) having one hydroxyl functional group or one amino functional group. In other examples, component (D) may be a homopolymer or copolymer of poly(ethylene glycol) having two hydroxyl functional groups or two amino functional groups at one end of its chain. The homopolymer or copolymer of poly(ethylene glycol) has a number average molecular weight (Mn) ranging from about 500 g/mol to about 5,000 g/mol. In another example, the homopolymer or copolymer of poly(ethylene glycol) has a number average molecular weight (Mn) ranging from about 500 g/mol to about 3,000 g/mol. Component (F) also has a water solubility of greater than 30% v/v (volume of poly(ethylene glycol) to volume of water). The amount of component (F) in the polyurethane-based binder dispersion ranges from 0 wt % to about 20 wt % based upon the total weight of the polyurethane-based binder dispersion. In an example, component (F) can be present in the polyurethane-based binder dispersion in an amount of from about 5 wt % to about 10 wt % of the polyurethane-based binder dispersion.

Any homopolymer of poly(ethylene glycol) with two hydroxyl or amino groups at one end of the polymer chain may alternatively be used as component (F), as long as the homopolymer has water solubility of >about 30% v/v and a suitable number average molecular weight. As an example, the homopolymer may be two hydroxyl terminated poly (ethylene glycol), where both hydroxyls are located at one end of the chain. One commercially available example is YMER® N120 (a linear difunctional polyethylene glycol monomethyl ether from Perstorp).

Non-Ionic Surfactant

The ink compositions that are part of the ink set comprise include surfactants. The surfactants are non-ionic surfactant. In some examples, the surfactants include an acetylenic surfactant and/or a phosphate surfactant. The non-ionic surfactant can be present in the ink composition at varying concentrations. In one example, the non-ionic surfactant can be present in the aqueous ink composition at from about 0.05 wt % to about 4 wt % based on the total wt % of the liquid ink. In another example, the non-ionic surfactant can be present in the aqueous ink composition from about 0.1 wt % to 3 wt %. In yet another example, the non-ionic surfactant can be present from about 0.25 wt % to about 1 wt %.

In some examples, the surfactants are acetylenic surfactants. In this example, the acetylenic surfactant may be present in an amount ranging from about 0.25 wt % to about 2 wt % (based on the total wt % of the liquid ink). Acetylenic surfactants can include acetylenic diols, alkoxylated acetylenic diols, and other acetylenic surfactants. Some specific examples include 2,7-dimethyl-4-octyn-3,6-diol, 7-tetradecyn-6,9-diol, 2,4,7,9-t etramethyl-5-decyne-4,7-diol, 1,4-dimethyl-1,4-bis(2-methylpropyl)-2-butyne-1,4-diyl ether, ethylene or propylene oxide condensates thereof, or a combination thereof. Some suitable commercially available acetylenic surfactants include Surfynol® and Dynol® surfactants available from Air Products. Examples of non-ionic surfactant can include Surfynol® SE-F, Dynol® 360, Surfynol® 5104, Surfynol® 5440, Surfynol® CT-211, or a combination thereof (all available from Air Products & Chemicals Inc., Pennsylvania). In another example, the non-ionic surfactant can include, Surfynol® SE-F, Surfynol® 5440, or Surfynol® CT-211. In yet another example, the non-ionic surfactant can include Dynol® 360.

In some examples, the surfactants are phosphate surfactants. In this example, the phosphate surfactant may be present in an amount ranging from about 0.25 wt % to about 2 wt % (based on the total wt % of the liquid ink). In some examples, the phosphate surfactant can be a phosphate ester of fatty alcohols or fatty alcohol alkoxylates. In one example, the surfactant can be a mixture of mono- and diesters, and may have an acid number ranging from 50 to 150. In another example, the phosphate-containing surfactant can be of the Crodafos® family. Specific examples include oleth-3 phosphate, oleth-10 phosphate, oleth-5 phosphate, dioleyl phosphate, ppg-5-ceteth-10 phosphate, $C_9$-$C_{15}$ alkyl monophosphate, deceth-4 phosphate, and mixtures thereof. Other specific examples by tradename include Crodafos® N3A, Crodafos® N3E, Crodafos® N10A, Crodafos® HCE, Crodafos® SG, Arlantone® Map 950, Monofax® 831, Monofas® 1214, Monalube® 215, and Atlox® DP13/6.

In some examples, the ink includes a combination of two type of surfactant (a first and a second). The first surfactant can be less water-soluble surfactants (surfactants with a lower HLB value) and the second surfactant can be higher water-soluble surfactants (surfactants with a higher HLB value). Indeed, it has been found that less water-soluble surfactants (surfactants with a lower HLB value) can be used in combination with higher water-soluble surfactants (surfactants with a higher HLB value) to achieve a surface tension of the ink which leads to improved image quality.

In the HLB system, which is for use with nonionic surfactants, the lower the HLB value, the more lipophilic (oil-soluble) the surfactant is, while the higher the HLB value, the more hydrophilic (water-soluble) the surfactant is. The HLB value in the HLB system may range from 0 to 20 or more. In a somewhat more detailed view of the HLB value, a surfactant having a value of 0 to 6 is considered to be hydrophobic (oil-soluble), while a surfactant having a value between 6 and 12 is considered to be water-dispersible, and a surfactant having a value greater than 12 is considered to be hydrophilic (water-soluble).

In some examples, the ink includes a combination of two type of surfactant (a first and a second). The first surfactant can be less water-soluble surfactants (surfactants with a lower HLB value) and the second surfactant can be higher water-soluble surfactants (surfactants with a higher HLB value). The HLB value of the first surfactant may be greater than about 6 and less than about 12, while the HLB value of the second surfactant may be less than about 6. In the mixture of the two surfactants described above, the first HLB value may be less than about 6, while the second HLB value may also be less than about 6.

In one example, the first surfactant (having the HLB value greater than 6 and less than 12) may be present in an amount ranging from about 0.05 weight percent (wt %) to about 2 wt % based on the total wt % of the inkjet ink. The second surfactant (having the HLB value less than 6) may also be present in an amount ranging from about 0.05 wt % to about 2 wt % based on the total wt % of the inkjet ink. The total concentration of the two surfactants in the inkjet ink may be within a range of about 0.1 wt % to about 4 wt %. In another examples, the first surfactant (having the HLB value less than 6) may be present in an amount ranging from about 0.05 weight percent (wt %) to about 0.9 wt % based on the total wt % of the inkjet ink. The second surfactant (also having the HLB value less than 6) may also be present in an amount ranging from about 0.05 wt % to about 0.9 wt % based on the total wt % of the inkjet ink. In this case, the maximum concentration of the two surfactants in the inkjet ink may be less than about 0.9 wt %, so as avoid any solubility issues of using two surfactants that each has low water solubility.

Humectant Solvent

The ink compositions that are part of the ink set comprises a humectant solvent. In some examples, the ink composition comprises a humectant solvent including a hydrophilic group. The humectant solvent can include glycerol, Dantocol® DHE (Di-(2-hydroxyethyl)-5, 5 dimethylhydantoin) (available from Lonza® Inc., New Jersey), tetraethylene glycol, tripropylene glycol, 2-hydroxyethyl pyrrolidone (2HE2P), Liponic® EG-1 or LEG-1, or combinations thereof. In one example, the humectant solvent includes glycerol (Glycereth-26). In yet another example, the humectant solvent includes 2-hydroxylethyl-2-pyrrolidone. In a further example, the humectant solvent includes tripropylene glycol. In yet a further example, the humectant solvent includes glycerol, 2-hydroxyletheyl-2-pyrrolidone, LEG-1, or a combination thereof. The humectant solvent can be present in the ink composition in an amount representing from about 1 wt % to about 15 wt % of the ink composition. In another example, the humectant solvent can be present from about 2 wt % to about 10 wt %. In yet another example, the humectant solvent can be present from about 3 wt % to about 8 wt % by total weight of the ink composition.

Glycol Ether Co-Solvent

The ink compositions that are part of the ink set comprises co-solvent. In some examples, the co-solvent is a glycol ether co-solvent. Examples of the glycol ether co-solvent include glycol alkyl ethers, propylene glycol alkyl ethers, and higher homologs ($C_6$-$C_{12}$) of polyethylene glycol alkyl ethers. Glycol ether co-solvents can have the molecular formula of R'—O—$CH_2CH_2OH$, where R' is a $C_1$-$C_7$ linear, branched, or cyclic alkyl group. In some examples, a single glycol ether co-solvent can be used. In other examples, a combination of glycol ether co-solvents can be used.

In some examples, the glycol ether can include ethylene glycol monobutyl ether. In some other examples, the glycol ether can include tripropylene-glycol methyl ether, dipropylene glycol butyl ether, diethylene glycol ethyl ether, propylene glycol phenyl ether, or a combination thereof. In yet some other examples, the non-volatile glycol ether co-solvent is tripropylene-glycol methyl ether. The glycol ether co-solvent can be a non-volatile glycol ether co-solvent. The non-volatile glycol ether co-solvent can be dipropylene glycol butyl ether, diethylene glycol ethyl ether, or a combination thereof. In a further example, the non-volatile glycol ether co-solvent can be propylene glycol ether. In some examples, the boiling point of the non-volatile glycol ether co-solvent can be 220° C. as mentioned, or can be 240° C. or greater. Examples of non-volatile glycol ether co-solvents having a boiling point over 240° C. can include tripropylene glycol methyl ether, dipropylene glycol butyl ether, or tripropylene glycol propyl ether. In one example, the non-volatile glycol ether co-solvent can be a non-hazardous substance as determined by the EPA at the time of filing the present disclosure. In some examples, the non-volatile glycol ether co-solvent can be hydrophobic and/or include hydrophobic functional groups. The non-volatile glycol ether co-solvent can be present in the aqueous ink composition at varying concentrations. In one example, the non-volatile glycol ether co-solvent can be present at from about 0.3 wt % to about 4.5 wt %. In another example, the non-volatile glycol ether co-solvent can be present from about 1 wt % to about 3 wt %. In yet another example, the non-volatile glycol ether co-solvent can be present at from about 2 wt % to about 3 wt %.

Wax Emulsion

The ink compositions that are part of the ink set comprises a wax. In some examples, the wax is a wax emulsion. In some other examples, the ink compositions that are part of the ink set comprises a polyethylene (PE) wax emulsion. The PE wax emulsion includes a polyethylene (PE) wax. In some other examples, the polyethylene wax emulsion and the inks exclude all other waxes besides the polyethylene wax. Without being linked by any theory, it is believed that the ink, including the polyethylene wax emulsion may have reduced agglomerate formation (as compared to other comparable inks including other waxes, e.g., polyethylene waxes) in thermal inkjet printhead nozzles both during storage and printing. In some examples, the polyethylene wax emulsion has a particle diameter that is less than 50 nm. In some other examples, the polyethylene wax emulsion and the liquid ink are free from polyethylene wax particles with a particle diameter equal to or greater than 50 nm. An example of a suitable wax is a wax emulsion such as Liquilube® 405, available from Lubrizol (Wickliffe, Ohio). In some examples, the wax can be present in an amount ranging from about 0.2 wt % to about 2.5 wt %. In some other examples, the wax can be present in an amount ranging from about 0.3 wt % to about 2 wt %. In some other examples, the wax can be present in an amount ranging from about 0.5 wt % to about 1 wt %. The PE wax emulsion may be present in the liquid ink in an amount ranging from about 0.1 wt % to about 1.5 wt % (based on the total wt % of the ink).

Water and Other Ingredients

The inkjet ink compositions described herein also include water (e.g., deionized water) in amounts to make up the balance of the inkjet ink compositions. In some examples, water can be present in the inkjet compositions in amounts greater than about 50 wt % based on the total weight of the inkjet ink composition. In some examples, the water can be present in the inkjet ink compositions in amounts from about 50 wt % to about 90 wt % based on the total weight of the inkjet ink composition. In other examples, the inkjet ink composition can include from about 60 wt % to about 88 wt % water. In further examples, the inkjet ink composition can include from about 70 wt % to about 85 wt % water.

The ink compositions that are part of the ink set might also comprise optional ingredients that are part of the ink vehicle. Such optional ingredient could be for examples, antimicrobial agents or anti-kogation agent. In some examples, the ink vehicle of the liquid thermal inkjet ink may also include viscosity modifier, materials for pH adjustment, sequestering agent, preservative, jettability additive, and the like.

The liquid vehicle may also include antimicrobial agent. Suitable antimicrobial agents include biocides and fungicides. Example antimicrobial agents may include the Nuosept® (Ashland Inc.), Ucarcide® or Kordek® (Dow Chemical Co.), and Proxel® (Arch Chemicals) series, Acticide® Series (Thor), and combinations thereof. In an example, the liquid ink may include a total amount of antimicrobial agents that ranges from about 0.1 wt % to about 0.25 wt %. In some instances, the antimicrobial agent may be present in the pigment dispersion that is added to the other ink components.

An anti-kogation agent may also be included in the ink vehicle. Kogation refers to the deposit of dried ink on a heating element of a thermal inkjet printhead. Anti-kogation agent(s) is/are included to assist in preventing the buildup of kogation. Examples of suitable anti-kogation agents include oleth-3-phosphate (commercially available as Crodafos® 03A or Crodafos® N-3 acid) or dextran 500 k. Other suitable examples of the anti-kogation agents include Crodafos® HCE (phosphate-ester from Croda Int.), Crodafos® N10 (oleth-10-phosphate from Croda Int.), or Dispersogen® LFH (polymeric dispersing agent with aromatic anchoring groups, acid form, anionic, from Clariant), etc. The anti-kogation agent may be present in the liquid ink in an amount ranging from about 0.1 wt % to about 1 wt % of the total wt % of the liquid ink.

System for Printing an Ink Set

In some examples, the inks, that are part of the ink set disclosed herein, are established on at least a portion of a print media, or substrate or printable medium, to form an image (i.e., text, graphics, etc.) using a printing technique. The amount of ink used depends, at least in part, on the desirable image to be formed. The ink composition may be deposited, established, or printed on the printable medium using any suitable printing device. In some examples, the ink composition is applied to the printable medium via inkjet printing techniques. The ink may be deposited, established, or printed on the medium via continuous inkjet printing or via drop-on-demand inkjet printing, which includes thermal inkjet printing and piezoelectric inkjet printing. The resulting printed image will have, for examples, enhanced image quality and image permanence.

The inventions disclosure relates thus to a system for printing an ink set, comprising an ink set comprising a black ink with a black pigment; a yellow ink with a yellow pigment; a cyan ink with a cyan pigment; and a magenta ink with a magenta pigment, wherein at least one of the inks further contains a polyurethane binder, non-ionic surfactants, humectant solvent non-volatile glycol ether co-solvent, a polyethylene wax emulsion and a balance of water; and an inkjet printer having the ink set loaded therein.

In some other examples, the system for printing an ink set comprises the ink set as defined above and an inkjet printer having a cyan inkjet ink, a magenta inkjet ink, a yellow inkjet ink and a black ink. In some other examples, the system for printing an ink set comprises the ink set as defined above and an inkjet printer having one or more ink selected from the group consisting of a cyan inkjet ink, a magenta inkjet ink, a yellow inkjet ink, a black inkjet ink, an orange inkjet ink, a violet inkjet ink, and a green inkjet ink.

Figure 1:
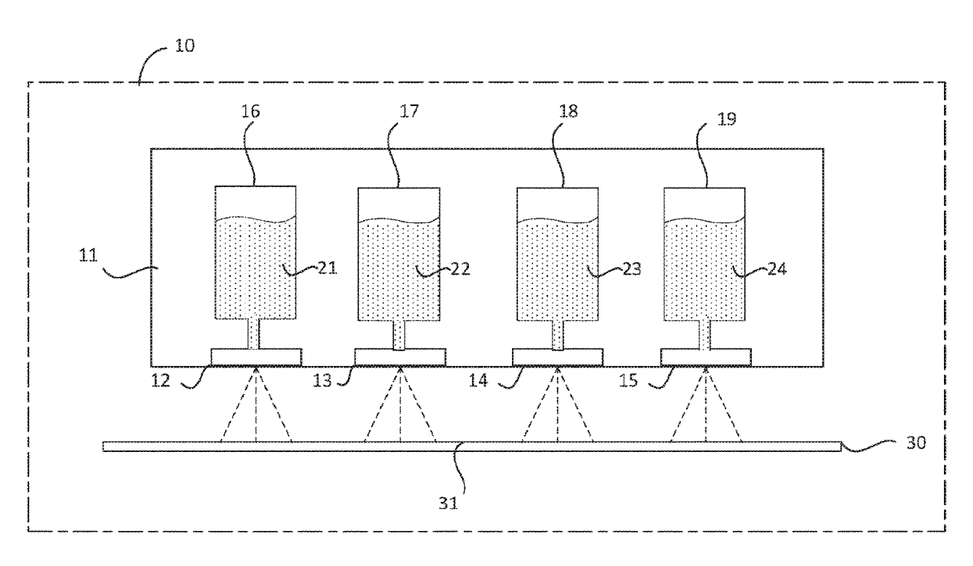
FIG. 1 is a schematic illustration of an example of system for printing an ink set according to one example of the present disclosure.

The system for printing an ink set is illustrated in FIG. 1. The system for printing an ink set, or inkjet printing system, 10 include a printer 11 and an ink set comprising a black ink 21 comprising a black pigment; a yellow ink 22 comprising a yellow pigment; a cyan ink 23 comprising a cyan pigment; and a magenta ink 24 comprising a magenta pigment. As shown in FIG. 1, the inkjet printing system 10 includes a printer 11 having, for example, four inkjet fluid ejectors 12, 13, 14, and 15. Each of the fluid ejectors 12, 13, 14, and 15 are fluidically coupled to respective chambers 16, 17, 18, and 19 which are operatively positioned inside the printer 11. In an example, one of the chambers of the system (e.g., the chamber 16) contains one of the inks of the ink set (such as the black ink 21), while another one of the chambers (e.g., the chamber 17) contains another one of the inks of the ink set (such as the yellow ink 22). The chambers 18 and 19 would contain respectively, for examples, the cyan ink 23 and the magenta ink 24. In some examples, the inkjet printing system 10 comprises a first ink chamber 16 including a black ink 21, a second ink chamber 17 including a yellow ink 22; a third ink chamber 18 including a cyan ink 23; a fourth ink chamber 19 including a magenta ink 24. Each of the fluid ejectors 12, 13, 14, and 15 are configured to eject its respective ink onto a surface 31 of a print media 30, where the inks are retrieved from their respective chambers 16, 17, 18, and 19 during printing. In some examples, the chambers 16, 17, 18, and 19 are ink reservoirs that are in fluid communication with fluid ejectors 12, 13, 14, and 15 that are inkjet printhead. Said fluid communication can be done thought a fluid conduit. In some other examples, the chambers 16, 17, 18, and 19 are ink reservoirs and are part of inkjet cartridges, the ink reservoirs are in direct fluid communication with the inkjet printhead.

It is to be understood that the printer 11 may also include additional fluid ejectors (not shown in FIG. 1), each of which is fluidically coupled to at least one other chamber (also not shown in FIG. 1). For example, the inkjet printing system 10 may include an ink set having five inks, each of which is stored in a respective chamber. As such, at least one other chamber may contain another colored ink (e.g., a green ink), if desired. The printer 12 would thus include at least five fluid ejectors and five chambers. However, it is to be understood that any suitable or desired number of fluid ejectors and chambers may be used. Further, it is to be understood that the ink chambers may be in fluid communication with a single fluid ejector, or may be in fluid communication with their own respective fluid ejectors.

The ink set disclosed herein may also include additional inks. Non-limiting examples of such inks include gray inks, orange inks, green inks, blue inks, violet inks, red inks, colorless inks, and combinations thereof. It is to be understood that any of these additional colored inks may be incorporated with light, medium or dark shades, as is desirable. As such, multiple inks of the same color may be included, where each of the inks has a different pigment loading. It is to be further understood that the pigment used in different shades may be the same or different. Furthermore, one or more dilutions of any of the colored inks may be included. In some examples, the inkjet ink set described herein further comprises a violet ink comprising a violet pigment. In some other examples, the inkjet ink set described herein further comprises a green ink comprising a green pigment. In yet some other examples, the inkjet ink set described herein further comprises an orange ink comprising an orange In some examples, the system for printing an ink set according to the present disclosure may further comprise a first ink chamber including a black ink with a black pigment, a second ink chamber including a yellow ink with a yellow pigment; a third ink chamber including a cyan ink with a cyan pigment; a fourth ink chamber including a magenta ink with a magenta pigment, wherein at least one of the inks further contains a polyurethane binder, non-ionic surfactants, humectant solvent non-volatile glycol ether co-solvent, a polyethylene wax emulsion and a balance of water. In some other examples, the system for printing an ink set can further include a fifth ink chamber including an ink that including a pigment which is selected from the group consisting of green, orange and purple pigments. In yet some other examples, the system for printing an ink set further includes multiples ink chambers including one or more ink each comprising pigment selected from the group consisting of green, orange and purple pigments.

The printable medium or media or substrate that will be printed may be any type of printable media. The printable medium can be specifically designed to receive any inkjet printable ink. In some examples, the printable medium is a packaging recording media, a label or a label stock. Packaging recording media or labels are indeed particularly well suited with the use of this ink set ink. As "packaging recording substrate", it is meant herein non-absorptive plastics and films thereof employed for so-called soft packaging, in addition to non-coated paper and coated paper. The packaging recording substrate can be packaging glassware (beverage bottles, cosmetic containers) or commercial glassware. A "label" is defined herein as a piece of paper, polymer, cloth, metal, or other material affixed to a container or article. As "label stock", it is meant herein a media substrate that can be coated on one side with adhesive and that can be printed on the other side. Label stocks can be a wide variety of papers, films, fabric, foils, etc. In some other examples, the recording media is a dark packaging recording media or dark label stock media.

EXAMPLES

Ingredients:

TABLE 1

| Ingredient name | Nature of the ingredient | Supplier |
|---|---|---|
| Polyurethane polymer | Grafted polyurethane polymer | HP Inc. |
| Surfynol ® 440 | Surfactants | Air Products |
| Dynol ® 360 | Surfactants | Air Products |
| Crodafos ® N3 | Phosphate Ester | Croda |

TABLE 1-continued

| Ingredient name | Nature of the ingredient | Supplier |
|---|---|---|
| LEG-1 | Glyerol ethoxylate | Lipo Chemicals Inc. |
| Dowanol ® TPM | Tripropylene Glycol Methyl Ether | Dow chemical |
| Glycerol | 1,2,3-propanetriol, glycerin | Sigma-Aldrich |
| Liquilube ® LL 405 | PE wax | Lubrizol |
| Black Dispersion | Pigment with styrene acrylic dispersant | HP Inc. |
| Cyan Dispersion | Pigment with styrene acrylic dispersant | HP Inc. |
| Magenta Dispersion | Pigment with styrene acrylic dispersant | HP Inc. |
| Yellow Dispersion | Pigment with styrene acrylic dispersant | HP Inc. |
| Orange Dispersion | Pigment with styrene acrylic dispersant | HP Inc. |
| Green Dispersion | Pigment with styrene acrylic dispersant | HP Inc. |
| Violet Dispersion | Pigment with styrene acrylic dispersant | HP Inc. |
| Acticide ® B20 | biocide | Thor |
| Acticide ® M20 | biocide | Thor |

Example 1—Ink Set Ink and Ink Composition

Different inkjet ink compositions are prepared with the components and the amounts as listed in Table 2. All percentages are expressed in wt % of the total weight of the ink composition. All inkjet ink compositions are then loaded into an ink set. The pH is adjusted by addition of KOH in order to achieve a pH of about 8.5 Ink 1 is a black ink comprising a back pigment; Ink 2 is a cyan ink comprising a cyan pigment; Ink 3 is a magenta ink comprising a magenta pigment; Ink 4 is a yellow ink comprising a yellow pigment; Ink 5 is an orange ink comprising an orange pigment; Ink 6 is a green ink comprising a green pigment; Ink 7 is a violet ink comprising a violet pigment.

TABLE 2

| Components | Ink 1 | Ink 2 | Ink 3 | Ink 4 | Ink 5 | Ink 6 | Ink 7 |
|---|---|---|---|---|---|---|---|
| Polyurethane Polymer | 5.00% | 3.50% | 3.50% | 3.50% | 3.50% | 3.50% | 3.50% |
| Surfynol ® 440 | 0.15% | 0.15% | 0.15% | 0.15% | 0.15% | 0.15% | 0.15% |
| Dynol ® 360 | 0.15% | 0.15% | 0.15% | 0.15% | 0.15% | 0.15% | 0.15% |
| Crodafos ® N3 | 0.50% | 0.50% | 0.50% | 0.50% | 0.50% | 0.50% | 0.50% |
| LEG-1 | 2.00% | 1.00% | 2.00% | 2.00% | 2.00% | 2.00% | 2.00% |
| Dowanol ® TPM | 2.00% | 2.00% | 2.00% | 3.00% | 3.00% | 3.00% | 3.00% |
| Glycerol | 7.00% | 6.00% | 7.00% | 7.00% | 7.00% | 7.00% | 7.00% |
| Liquilube ® LL 405 | 0.75% | 0.50% | 0.50% | 0.50% | 0.50% | 0.50% | 0.50% |
| Black Dispersion | 2.75% | | | | | | |
| Cyan Dispersion | | 2.25% | | | | | |
| Magenta Dispersion | | | 4.00% | | | | |
| Yellow Dispersion | | | | 4.00% | | | |
| Orange Dispersion | | | | | 4.25% | | |
| Green Dispersion | | | | | | 3.40% | |
| Violet Dispersion | | | | | | | 1.5% |
| Acticide ® B20 | 0.15% | 0.15% | 0.15% | 0.15% | 0.15% | 0.15% | 0.15% |
| Acticide ® M20 | 0.07% | 0.07% | 0.07% | 0.07% | 0.07% | 0.07% | 0.07% |
| Water | balance | balance | balance | balance | balance | balance | balance |

Example 2—Print Performances

The ink set comprising the ink compositions 1 to 7 are printed on different paper-based media (HP® Multipurpose Paper-ColorLok® (International Paper Company; Staples Copy Paper (Made from Staples), Georgia Pacific copy paper (Georgia Pacific) and also on a porous media substrate (corrugated board). Printing is performed at various percentages with 1200×1200 dpi and various ink flux (ng/300 dpi). The ink compositions are printed using a HP Inc. printer. The resulting printed articles are then tested for their print quality (KOD) and for their durability (Sutherland Rub and wet Rub). Some results are illustrated in Table 3.

The Durability test, in accordance with ASTM D-5264, is performed by exposing the various Samples to be tested with a Sutherland® Ink Rub tester with 2 lb weigh and 5 cycles. It is designed to evaluate the scuffing or rubbing resistance of the printed or coated surface of paper, paperboard, film and other materials. The Sutherland® Ink Rub tester features a digital counter with a fiber optic sensor for accuracy and is compatible with the requirements of the ASTM D-5264 test method. on normal and heated condition). The "visual difference" in the printed surface are visually rated (with a score between 1 and 5, 1 is worst, 5 is best). The KOD measures the black optical density of black areas fill. The KOD is measured by Spectro-densitometer Model 938 supplied by X-rite. A higher score means a better performance.

Table 3 illustrates some results obtained, on uncoated paper, when using an ink set comprising different formulations for the black ink 1, with different amount of polyurethane polymer and different amount of wax.

The ink set according to the present disclosure provides printed samples that show excellent print quality (ink efficiency) and improved adhesion performances; such results being independent of the type of media used: treated) (ColorLok®) and untreated paper (Staples Copy Paper).

TABLE 3

| Black Ink 1 | Wet rub Resistance | Sutherland Rub Resistance |
| --- | --- | --- |
| With 2.00% Polyurethane Polymer | 2.5 | 1.0 |
| With 5.00% Polyurethane Polymer | 5.0 | 5.0 |
| With 0.30% Wax (Liquilube ® LL 405) | — | 1.0 |
| With 0.75% Wax (Liquilube ® LL 405) | — | 5.0 |

The invention claimed is:

1. An inkjet ink set, comprising:
   a black ink with a black pigment;
   a yellow ink with a yellow pigment;
   a cyan ink with a cyan pigment; and
   a magenta ink with a magenta pigment;
   wherein at least one of the inks further contains: a polyurethane binder; non-ionic surfactants; a humectant solvent; a non-volatile glycol ether co-solvent; a polyethylene wax emulsion; and a balance of water;
   wherein the non-ionic surfactants consist of i) an acetylenic non-ionic surfactant present in an amount from about 0.25 wt % to about 1 wt % of the at least one of the inks and ii) a phosphate surfactant present in an amount from about 0.25 wt % to about 2 wt % of the at least one of the inks, wherein the phosphate surfactant is a phosphate ester of a fatty alcohol or of a fatty alcohol alkoxylate;
   and wherein the non-volatile glycol ether co-solvent is selected from the group consisting of tripropyleneglycol methyl ether, dipropylene glycol butyl ether, propylene glycol phenyl ether, and combinations thereof.

2. The inkjet ink set of claim 1 wherein the pigments that are part of the black, yellow, cyan, and/or magenta ink are dispersed by an anionic polymer.

3. The inkjet ink set of claim 1 that further comprises one or more inks selected from the group consisting of an orange ink with an orange pigment, a violet ink with a violet pigment and a green ink with a green pigment.

4. The inkjet ink set of claim 1 wherein the polyurethane binder is polyurethane graft polyol.

5. The inkjet ink set of claim 1 wherein the polyurethane binder contains a polyisocyanate; a first polyol having a chain with two hydroxyl functional groups at one end of the chain and no hydroxyl groups at an opposed end of the chain and a second polyol having a chain with two hydroxyl functional groups at both ends of the chain.

6. The inkjet ink set of claim 1 wherein the polyurethane binder contains (A) a polyisocyanate; (B) a first polyol having a chain with two hydroxyl functional groups at one end of the chain and no hydroxyl groups at an opposed end of the chain; (C) a second polyol having a chain with two hydroxyl functional groups at both ends of the chain; (D) a carboxylic acid functional group with two hydroxyl functional groups; and (E) a compound shown in formula $[(M+)_m; (X)_n\text{---}R\text{---}Y]$ wherein: m is 0 or 1; M is a metal; n is 2 to 10; X is an amino group, R is a $C_1$ to $C_{18}$ alkyl group, a $C_6$ to $C_{30}$ aromatic compound or a $C_4$ to $C_{20}$ aliphatic cyclic compound, and Y is $SO_3^-$ or $SO_3H$ with the proviso that when m is 0, Y is $SO_3H$ and when m is 1, Y is $SO_3^-$.

7. The inkjet ink set of claim 1 wherein the humectant solvent includes a hydrophilic group.

8. The inkjet ink set of claim 1 wherein the humectant solvent includes glycerol.

9. The inkjet ink set of claim 1 wherein the polyethylene wax emulsion is present in an amount ranging from about 0.2 wt % to about 2.5 wt %.

10. The inkjet ink set of claim 1 wherein a boiling point of the non-volatile glycol ether co-solvent is greater than or equal to 220° C.

* * * * *